United States Patent
Liu

(10) Patent No.: US 10,412,035 B2
(45) Date of Patent: Sep. 10, 2019

(54) METHOD AND DEVICE FOR PUSHING INFORMATION BASED ON COMMUNICATION GROUP

(71) Applicant: BEIJING QIHOO TECHNOLOGY COMPANY LIMITED, Beijing (CN)

(72) Inventor: Yiping Liu, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 193 days.

(21) Appl. No.: 15/540,070

(22) PCT Filed: Nov. 24, 2015

(86) PCT No.: PCT/CN2015/095457
§ 371 (c)(1),
(2) Date: Jun. 27, 2017

(87) PCT Pub. No.: WO2016/101750
PCT Pub. Date: Jun. 30, 2016

(65) Prior Publication Data
US 2017/0346775 A1 Nov. 30, 2017

(30) Foreign Application Priority Data
Dec. 27, 2014 (CN) .......................... 2014 1 0836040

(51) Int. Cl.
*G06F 13/00* (2006.01)
*H04L 12/58* (2006.01)
(Continued)

(52) U.S. Cl.
CPC .......... *H04L 51/20* (2013.01); *H04L 12/1859* (2013.01); *H04L 29/08* (2013.01);
(Continued)

(58) Field of Classification Search
CPC ..... H04L 51/20; H04L 29/08; H04L 12/1859; H04L 67/26; H04L 4/02; H04W 4/08; H04W 4/02; H04W 4/029
(Continued)

(56) References Cited

U.S. PATENT DOCUMENTS 6,983,139 B2 * 1/2006 Dowling ............. H04L 12/1859
455/414.2
10,120,947 B2 * 11/2018 Kritt .................... G06F 16/9537
(Continued)

FOREIGN PATENT DOCUMENTS

CN    103685415 A    3/2014
CN    103905291 A    7/2014
(Continued)

OTHER PUBLICATIONS

PCT/CN2015/095457, International Search Report, dated Mar. 1, 2016.

*Primary Examiner* — Kenneth R Coulter
(74) *Attorney, Agent, or Firm* — Grogan, Tuccillo & Vanderleeden, LLP

(57) ABSTRACT

Disclosed are a method and a device for pushing information based on a communication group. The method includes: receiving a configuration request for a communication group transmitted by a first terminal, where the configuration request includes geographical coordinate information and a first user identifier; recognizing position information corresponding to the geographical coordinate information; acquiring a communication group matching with the position information, where the communication group has one or more associated second user identifiers; searching for a second user identifier and a communication manner matching with the first user identifier; and pushing the communication manner to the first terminal and a second terminal,
(Continued)

where the second terminal corresponds to the second user identifier matching with the first user identifier.

16 Claims, 7 Drawing Sheets

(51) Int. Cl.
    *H04W 4/029*     (2018.01)
    *H04L 29/08*     (2006.01)
    *H04L 12/18*     (2006.01)
    *H04W 4/02*     (2018.01)
    *H04W 4/08*     (2009.01)

(52) U.S. Cl.
    CPC ............... *H04L 67/26* (2013.01); *H04W 4/02* (2013.01); *H04W 4/029* (2018.02); *H04W 4/08* (2013.01)

(58) Field of Classification Search
    USPC ........ 709/204–207, 217–219, 220–222, 242; 715/751–759; 434/350–351
    See application file for complete search history.

(56) References Cited

U.S. PATENT DOCUMENTS

| | | | |
|---|---|---|---|
| 2005/0032528 A1* | 2/2005 | Dowling | H04L 12/1859 455/456.1 |
| 2016/0103853 A1* | 4/2016 | Kritt | G06F 16/9537 707/758 |
| 2017/0123069 A1* | 5/2017 | Kotab | G01S 19/13 |
| 2017/0242569 A1* | 8/2017 | Frind | G06N 5/04 |

FOREIGN PATENT DOCUMENTS

| | | |
|---|---|---|
| CN | 104580430 A | 4/2015 |
| WO | 2012094235 A2 | 7/2012 |

\* cited by examiner

METHOD AND DEVICE FOR PUSHING INFORMATION BASED ON COMMUNICATION GROUP

CROSS-REFERENCE TO RELATED APPLICATIONS

This application is the national stage of International Application No. PCT/CN2015/095457 filed Nov. 24, 2015 which is based upon and claims priority of Chinese Patent Application No. CN201410836040. X, filed Dec. 27, 2014, the entire contents of all of which are incorporated herein by reference.

TECHNICAL FIELD

The disclosure relates to the field of communication technology, and particularly to a method and a device for pushing information based on a communication group.

BACKGROUND

With development of communication technology, a communication system has been accepted by more and more people, and has been increasingly widely applied into various aspects in work, study and daily life, as it were, the communication system has been an indispensable part of people's lives.

Multiple individuals gathered are referred to as a group. In a social network, those individuals are gathered for a certain common reason, for example, an interest, a geographical position and work. A class group, a company group and so on can be created for convenience of communication.

However, in a communication group, a creator of the group or a manager authorized by the creator is required for management, and the other users need to search actively based on a key word and can join into the communication group only in a case of applying or being invited. Also, a terminal of the user invited or applying or a terminal of the manager performs multiple communication with a server in an invitation or application process, which results in a complex operation, large time consumption, and great consumption for system resources and a network bandwidth of the terminal and the server.

The user requires adding other users as friends in the communication group, generally, the user needs to view profiles of different users several times, and sends a request only after selecting an interested user, which results in a complex operation and large time consumption, and great consumption for the system resources and the network bandwidth caused by making multiple responses to the view operation by the first terminal and the server.

SUMMARY

In view of the above problems, a method and a device for pushing information based on a communication group are provided, to solve the above problems or at least partially solve or relieve the above problems.

A method for pushing information based on a communication group is provided according to an aspect of the present disclosure, which includes: receiving a configuration request for a communication group transmitted by a first terminal, where the configuration request includes geographical coordinate information and a first user identifier; recognizing position information corresponding to the geographical coordinate information; acquiring a communication group matching with the position information, where the communication group has one or more associated second user identifiers; searching for a second user identifier and a communication manner matching with the first user identifier; and pushing the communication manner to the first terminal and a second terminal, where the second terminal corresponds to the second user identifier matching with the first user identifier.

A device for pushing information based on a communication group is provided according to another aspect of the present disclosure, which includes: one or more processors; and a memory; wherein one or more programs are stored in the memory, and when executed by the one or more processors, the one or more programs cause the one or more processors to: receive a configuration request for a communication group transmitted by a first terminal, wherein the configuration request comprises geographical coordinate information and a first user identifier; recognize position information corresponding to the geographical coordinate information; acquire a communication group matching with the position information, wherein the communication group has one or more associated second user identifiers; search for a second user identifier and a communication manner matching with the first user identifier; and push the communication manner to the first terminal and a second terminal respectively, wherein the second terminal corresponds to the second user identifier matching with the first user identifier.

A computer program is provided according to yet another aspect of the present disclosure, which includes program readable codes. The program readable codes enable a computer device to execute the method for pushing information based on the communication group described above when being run on the computer device.

A computer readable medium on which the above computer program is stored is provided according to yet another aspect of the present disclosure.

The disclosure has advantageous effects as follows: in the embodiments of the present disclosure, position information corresponding to geographical coordinate information is recognized based on a configuration request for a communication group transmitted by the first terminal, and a communication group matching with the position information is acquired, and the communication manner is pushed to the first terminal and the second terminal associated with each other in the communication group, a communication manner with other users is acquired by automatically joining into the group without an operation of viewing and selecting profiles of the other users by a current user several times, thereby greatly improving operation convenience, reducing a time cost, and reducing consumption for system resources and a network bandwidth caused by making multiple responses to a view operation by the first terminal and the server.

In the embodiments of the present disclosure, the position information corresponding to the geographical coordinate information of the first terminal is recognized based on the configuration request for the communication group transmitted by the first terminal, matching is performed between the position information and a communication group created previously, and an association relation between a user identifier and the communication group is created, therefore, the user can join into the communication group automatically without searching for the communication group based on a key word. Since all users in the communication group have a same permission, and can join into the communication group without invitation or application, thereby reducing a communication frequency between a terminal of a user invited or applying or a terminal of a manager and a server in an application or invitation process, greatly improving operation convenience, reducing time consumption and reducing consumption for system resources and a network bandwidth of the terminal and the server.

In the embodiments of the present disclosure, characteristic region information of a characteristic region to which the geographical coordinate information belongs, and therefore, completeness of the region can be ensured. Since the position information is used as a group name, and the communication group is identified by the group name uniquely, thereby ensuring completeness of the communication group in the same characteristic region, and avoiding the communication group from being divided.

In addition, since the range of the characteristic region is large, positioning in the characteristic region has high accuracy, thereby fixing a problem that positioning accuracy is low in some cases, and reducing an influence that an error occurs in joining into the communication group since an error occurs in positioning of the position information, and improving fault tolerance.

In the embodiments of the present disclosure, communication groups matching with one or more candidate position information are queried in a candidate range, and are returned to the terminal to be displayed. By suitably extending the candidate range for the communication group, a correct communication group is returned to the first terminal in a case that an error occurs in positioning, to be selected by the user, thereby fixing a problem that positioning accuracy is low in some cases, and reducing an influence that an error occurs in joining into the communication group since an error occurs in positioning of the position information, and improving fault tolerance.

In the embodiment of the present disclosure, information on communication groups ranked based on communication frequencies is returned to the first terminal to be display, the communication group having a larger communication frequency may be ranked ahead preferentially to be displayed, thereby avoiding the user from performing an operation such as page turning, further improving operation convenience, and reducing resources consumed when the terminal makes a response to the operation.

In the embodiment of the present disclosure, the characteristic position information is used as a group name, in this way, the user is reminded of a geographical property of the communication group in a simple way without viewing information such as introduction of the communication group, operation convenience is further improved.

In addition, the characteristic position information has uniqueness, the communication group also has uniqueness, thereby avoiding from creating a same group, and wasting resources, and making communication between users be centralized, easy and convenient, and further improving operation convenience.

The above description is only overview of the technical solution of the present disclosure, and the embodiments of the present disclosure are given, to make the technical solution of the present disclosure be understood clearer, implement the technical solution based on contents of the specification, and make the above and other objective, features and advantages of the present disclosure easy to be understood.

BRIEF DESCRIPTION OF THE DRAWINGS

By reading the detailed description of the preferred embodiments below, various other advantages and benefits become clear for a person of ordinary skill in the art. The drawings are only used for showing the preferred embodiments and are not intended to limit the present invention. And in the whole drawings, same drawing reference signs are used for representing same components. In the drawings.

DETAILED DESCRIPTION

The embodiments of the present disclosure are further described in conjunction with the drawings.

Figure 1:
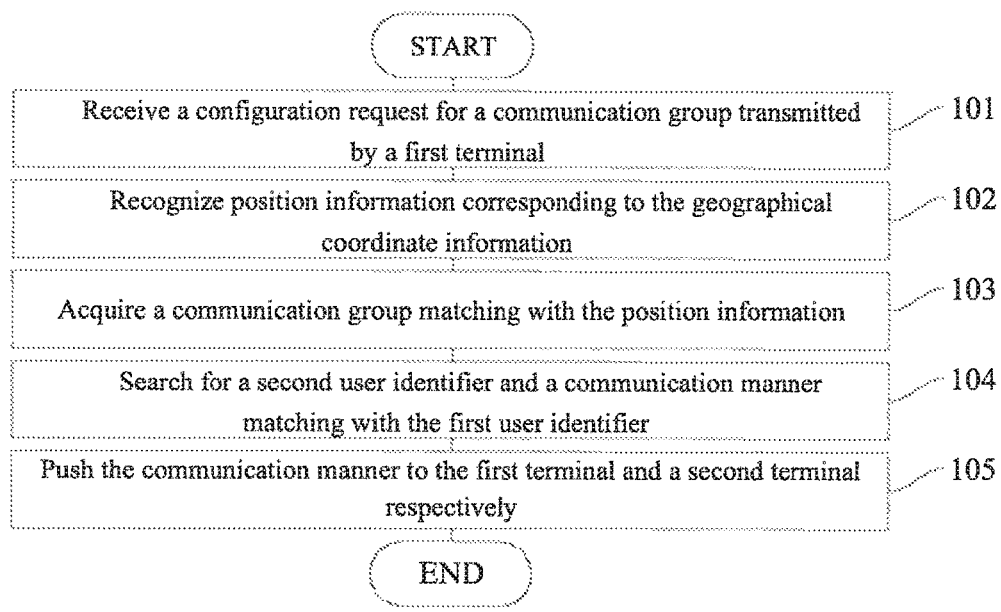
FIG. 1 is a schematic flow diagram of steps of a method for pushing information based on a communication group according to a first embodiment of the present disclosure.

With reference to FIG. 1, which is a schematic flow diagram of steps of a method for pushing information based on a communication group according to an embodiment of the present disclosure, the method includes the following steps:

In step 101, a configuration request for the communication group transmitted by a first terminal is received. The configuration request includes geographical coordinate information and a first user identifier.

In step 102, position information corresponding to the geographical coordinate information is recognized.

In step 103, a communication group matching with the position information is acquired.

In an implementation, the communication group may have one or more associated second user identifiers.

The second user identifier may be information representing a user determined uniquely, for example, a user identity (abbreviated as ID), a user account or other information (such as a phone number or an email) bound to the user ID or the user account.

In step 104, a second user identifier and a communication manner matching with the first user identifier are searched for.

It should be illustrated that the first user identifier and the one or more second user identifiers belong to a same communication group, and the first user identifier is not associated with the one or more second user identifiers, that is, there is no "friend" relation between the first user identifier and the one or more second user identifiers, the first user identifier is strange with respect to the one or more second user identifiers.

In an optional embodiment of the present disclosure, step 104 may include substeps S11 to S13.

In substep S11, the one or more second user identifiers are searched for one or more candidate second user identifiers having path information at least partially coincided with path information of the first user identifier.

According to the embodiment of the present disclosure, geographical coordinate information transmitted by a terminal at different time instants may be collected in advance, and different geographical coordinate information are linked together, and path information of a user identifier (for example, the first user identifier or the second user identifier) logging onto the terminal can be acquired, to indicate a path passed through by the user.

In an optional example of the embodiment of the present disclosure, substep S11 may include the following substeps.

In substep S111, first path information corresponding to the first user identifier is searched for.

In substep S112, one or more second path information corresponding to the one or more second user identifiers are searched for.

In substep S113, a coincidence degree between the first path information and each of the one or more second path information is calculated.

In substep S114, one or more second user identifiers having large coincidence degrees are extracted as the one or more candidate second user identifiers.

In the embodiment of the present disclosure, a large coincidence degree may mean that the users perform activities in adjacent locations, for example, the user may take a same bus to work, or may often go to a same court to play ball games.

The one or more second user identifiers having larger coincidence degrees are served as the one or more candidate second user identifiers makes the user feel that the other user is a real person, and the other user may be located around and therefore have a stronger willingness to communication with the other user.

In substep S12, the one or more candidate second user identifiers are searched for one or more second user identifiers having behavior information or user information matching with behavior information or user information of the first user identifier.

In the embodiment of the present disclosure, behavior information associated with a user identifier (for example, the first user identifier and the second user identifier) may be collected in advance.

The behavior information may include local operation behavior information of the user, for example, opening a video player to play a video or opening a game.

The behavior information may further include operation behavior information of the user on Internet, for example, expressing an opinion for an event, browsing a webpage or reading a book.

The behavior information can represent a behavior tendency of the user to a certain extent. In a case that the behavior information of the users match with each other, the users may have same or similar interests, the more the behavior information matching with each other is, the more the same or similar interests between the user is.

The user information may be filled out by a current user, for example, a home address, sexuality and an age.

The user information may also be filled out by other users, for example, friend impression (a literary youth, a typical foodies, an older female to be married).

The user information may represent characteristics of the user to some extent. In a case that the user information of the users match with each other, the users may have same or similar characteristics, the more the user information matching with each other is, the more the same or similar characteristics are.

In an implementation, behavior information matching or user information matching is performed between the first user identifier and the second user identifier by using a natural language processing (NLP) or other ways.

The natural language processing has two levels on the whole. One is shallow parsing, such as word segmentation and word property marking. Generally, it only needs to perform parsing processing on local range of a sentence. The other is deep processing on the language, it needs to perform global parsing on the sentence, and the sentence is parsed in three hierarchies of syntax, semantics and pragmatics.

It can be considered that the behavior information of the users match with each other in a case of a same type of played videos, a same type of opened games, similar opinions expressed for an event, a similar type of browsed webpages or a similar type of read books. And it can be considered that the user information of the users match with each other in a case of close home addresses, opposite sexualities, close age or same friend impression.

In substep S13, a communication manner matching with the position information or the user information is searched for.

The communication manner may refer to a connection or communication manner between a user corresponding to the first user identifier and a user corresponding to the second user identifier.

In an optional example of the embodiment of the present disclosure, substep S13 may include the following substeps.

In substep S21, property information of the position information is queried.

In substep S22, a communication manner matching with the property information is searched for.

In the embodiment of the present disclosure, property information is set for the position information in advance, that is, the property information is a characteristic included in the position information.

For example, property information of the Beijing University and the China University of Geosciences may be university, and property information of Hongyuan Building may be office building or the like.

For the any position information, a communication manner suitable for its property information may be set.

For example, a communication manner suitable for university may be a reading club, a lecture or the like.

A communication manner suitable for office building may be eating, dating or the like.

In another optional embodiment of the present disclosure, for any user information, a communication manner suitable for the user information may be set in advance.

For example, a communication manner suitable for the friend impression (for example, a literary youth, a typical foodie and an older female to be married) may be discussion or sharing in a certain aspect.

A communication manner suitable for the home address may be carpooling, going together or the like.

Furthermore, in the embodiment of the present disclosure, message information suitable for the communication manner matching with the position information or the user information in current may be acquired from a third-party platform, and may be written into the communication manner, to enhance authenticity of the communication.

For example, for a communication manner corresponding to a lectureship, information (such as a speaker, a theme, a time instant and an address) on a current lectureship may be acquired from a website of the university, and may be added into the communication manner. For a communication manner corresponding to a dinner, information (such as, a restaurant, a menu and a price) on the dinner may be acquired from a group-buying website, and may be added into the communication manner.

In step 105, the communication manner is pushed to the first terminal and the second terminal, the second terminal corresponds to the second user identifier matching with the first user identifier.

In the embodiment of the present disclosure, the communication manner is pushed to the user of the first terminal and the user of the second terminal, to recommend other users and a communication manner corresponding to the users.

In an optional embodiment of the present disclosure, step 105 may include the following substeps.

In substep S31, the communication manner is pushed to the first terminal.

In substep S32, the communication manner is pushed to the second terminal.

In the embodiment of the present disclosure, the communication manner may be directly pushed to the first terminal and the second terminal.

In an optional embodiment of the present disclosure, step 105 may include the following substeps.

In substep S41, the communication manner is pushed to the first terminal.

In substep S42, on receiving an acknowledge operation returned from the first terminal for the communication manner, the communication manner is pushed to the second terminal corresponding to the acknowledge operation.

In the embodiment of the present disclosure, the communication manner may be directly pushed to the first terminal, and the user of the first terminal selects a suitable communication manner according to actual needs, and pushes the suitable communication manner to the second terminal.

For example, a communication manner of dinning with a user and a communication manner of carpooling with a user at noon are pushed to the first terminal, the user of the first terminal may think that dinning is more suitable with consideration of the noon, and may determine the communication manner of dinning.

In the embodiment of the present disclosure, position information corresponding to geographical coordinate information is recognized based on a configuration request for the communication group transmitted by the first terminal, and a communication group matching with the position information is acquired, and a communication manner is pushed to the first terminal and the second terminal associated in the communication group, a communication manner with other users is acquired by automatically joining into the group without an operation of viewing and selecting profiles of the other users by a current user several times, thereby greatly improving operation convenience, reducing a time cost, and reducing consumption for system resources and a network bandwidth caused by making multiple responses to a view operation by the first terminal and the server.

Figure 2:
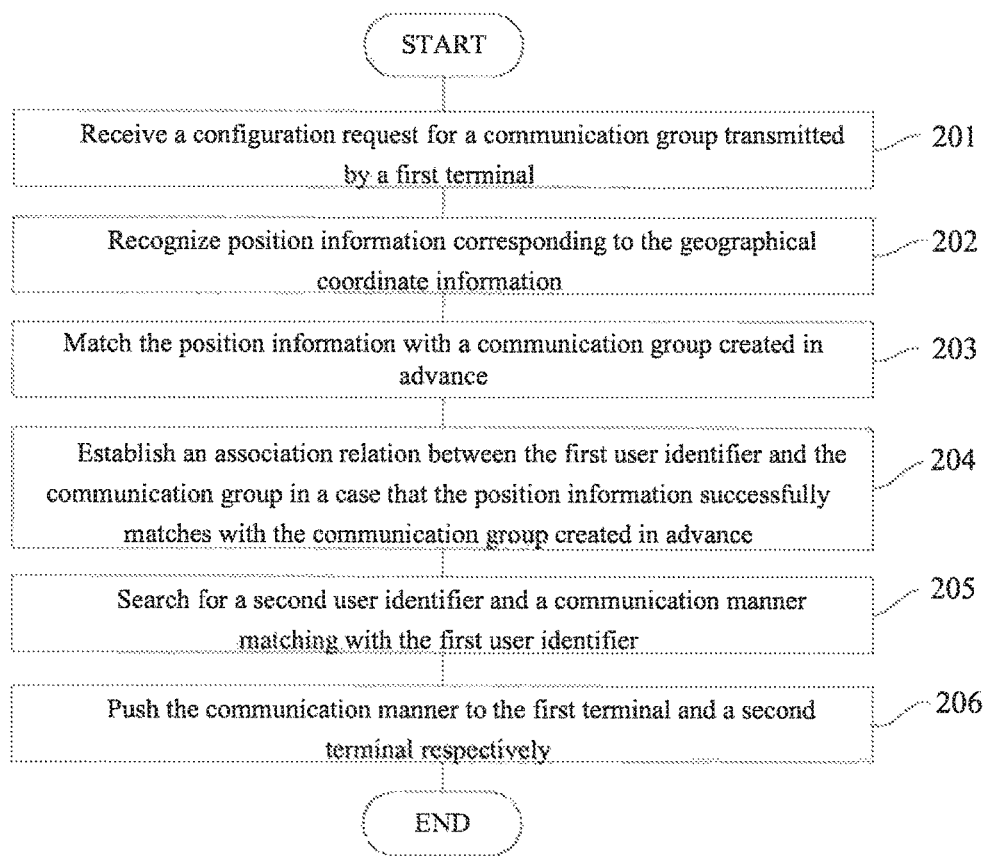
FIG. 2 is a schematic flow diagram of steps of a method for pushing information based on a communication group according to a second embodiment of the present disclosure.

With reference to FIG. 2, which is a schematic flow diagram of steps in a method for pushing information based on a communication group according to an embodiment of the present disclosure, the method includes the following steps:

In step 201, a configuration request for a communication group transmitted by a first terminal is received.

It should be illustrated that the embodiment of the present disclosure can be applied into a server (for example a cloud server), the server may be connected to one or more terminals (such as a first terminal and a second terminal) via a network, the terminals may include a phone, a personal digital assistant (PDA), a laptop computer, a handheld computer and the like, which are not limited in the embodiment of the present disclosure.

The terminals can support an operation system such as Windows, Android, IOS and Windows Phone, and can run clients which perform input and other functions through voice, a keyboard (including a physical keyboard, a virtual keyboard) and other manners.

One or more users logging onto clients of one or more terminals can trigger creating a communication group, to enable the one or more users to perform communication in the range of the communication group.

The configuration request for a communication group may refer to an instruction for configuring the communication group transmitted by the user, and may be joining the communication group or creating a communication group. For example, the user may request configuring the communication group by opening a main interface of the client, or by a control specified in the client or the like.

The configuration request includes geographical coordination information and a first user identifier.

The geographical coordinate information may be coordinates representing a position of a ground point. The geographical coordinate information may include a longitude and latitude, and may include other information, which is not limited thereto.

The first user identifier may be information representing a user determined uniquely, such as a user Identity (abbreviated as ID), a user account or other information (such as a telephone number and an email) bound to the user ID or the user account.

In actual applications, the first terminal can acquire the geographical coordinate information in various positioning ways such as a satellite positioning way, a wireless fidelity positioning way, a base station positioning way, a cell identification code positioning way and an advanced forward link triangulation positioning way.

In the satellite positioning way, a position signal of the terminal is transmitted to a positioning background to perform positioning. A satellite positioning system available currently includes GPS, GLONASS, a Beidou system, a Galileo system and the like.

In the wireless fidelity (WIFI) way, positioning is performed based on strength of signals transmitted by WIFI hotspots deployed in various locations and a global unique media access control address (MAC, or referred to a physical address for defining a position of a network device).

In the base station positioning way, a position of the terminal is determined by measuring a distance between the terminal and a base station of an operator (such as the mobile operator, the telecom operator or the unicom operator).

In the cell identification code (Cell ID) positioning way, a cell number (which is estimated according to a serving base station) of the terminal is reported by a wireless network (such as a cellular network), and a position business platform translates the cell number into longitude and latitude coordinates.

In a case that advanced forward link trilateration measurement (AFLT) is used to perform a positioning operation, the terminal monitors pilot information of multiple base station (at least three base stations) simultaneously, and a distance from the terminal to a nearby base station is determined by a chip time delay, and the position of the terminal can be calculated with the triangulation positioning method.

In the embodiment of the present disclosure, the positioning may be performed in the satellite positioning way, the base station positioning way and the wireless fidelity positioning way and the like further in conjunction with the cell identification code positioning way and the advanced forward link triangulation positioning way, to improve accuracy of the positioning.

For example, the positioning is performed on a phone in a hybrid positioning way in which the satellite positioning way, the base station positioning way and the wireless fidelity positioning way are combined with each other.

In step S202, position information corresponding to the geographical coordinate position is recognized.

Since the terminal such as the cell phone is generally a private belonging, and is carried with the user to which the terminal belongs and used by the user, a position where the user is located currently can be recognized by recognizing the position information corresponding to the geographical coordinate position.

The position information corresponding to the geographical coordinate information can be recognized by reverse geocoding in an implementation.

The reverse geocoding corresponds to geocoding.

A geocoding service, that is, address matching, refers to converting known address description into longitude and latitude coordinates, that is, geographical coordinates corresponding to the address are queried based on the position information.

The reverse geocoding may be an address parsing service, and refers to converting known geographical coordinate information (such as known longitude and latitude coordinates) into position information (such as a province, a city, a street, a floor and a room) corresponding to the geographical coordinate information.

In an optional embodiment of the present disclosure, the position information may include characteristic region information, and step 202 in the embodiment of the present disclosure may include a following substep:

In substep S51, characteristic region information of a characteristic region where the geographical coordinate information belongs to is acquired.

In the embodiment of the present disclosure, some famous regions, hot regions or the like may be set as a characteristic region in advance, and are configured with characteristic region information (such as a name), for example, the Beijing university and the China University of Geosciences.

In a case that the geographical coordinate information falls within the characteristic region, characteristic region information of the characteristic region can be acquired.

For example, in a case that a user is located at any point within the China University of Geosciences, the characteristic region information returned may be the China University of Geosciences rather than a single location where the geographical coordinate information falls.

In the embodiment of the present disclosure, the characteristic region information of the characteristic region which the geographical coordinate information belongs to is acquired, therefore, a completeness of the region is ensured. Since the position information is used as a group name, and the communication group is identified uniquely by the position information, completeness of the communication group in a same characteristic region is ensured, and the communication group is avoided from being divided.

In addition, since the range of the characteristic region is large, positioning in the characteristic region has higher accuracy, thereby fixing a problem that positioning accuracy is lower in some cases, and reducing an influence that an error occurs in joining into the communication group since an error occurs in positioning of the position information, and improving fault tolerance.

In the implementation, if there is a first geographical server for providing a characteristic region recognition service, an interface provided by the first geographical server can be called. The geographical coordinate information is assembled to a call request according to parameter specifications of the interface, and the call request is transmitted to the interface, to call the characteristic region recognition service of the first geographical server, and acquire the characteristic region information returned by the first geographical server.

For example, the China University of Geosciences may be set as a characteristic region in advance, a latitude and longitude of a position where the user is located acquired by the terminal is 116.346586 and 39.990677, a call request as follows can be generated: http://restapi.map..com/api/simple.php?sid=7001&number=0&addr_desc=true&show_addr=true&x=116.346586&y=39.990677, where "" denotes a domain name of the first geographical server.

The call request is transmitted to the interface of the first geographical server to query, the first geographical server will return "the China University of Geosciences" after recognizing that the latitude and longitude is located in the China University of Geosciences.

In the embodiment of the present disclosure, the existing characteristic region recognition service is reused by calling the first geographical server, therefore, thereby reducing the cost.

In practice, a component for providing the characteristic region recognition service may be deployed locally in the embodiment of the present disclosure, to speed up in recognizing the characteristic region, which is not limited in the embodiment of the present disclosure.

In another optional embodiment of the present disclosure, the position information may include location information, and in the embodiment of the present disclosure, step 202 may include following substep:

In substep S52, location information corresponding to the geographical coordinate information is acquired.

In the embodiment of the present disclosure, a point location where the geographical coordinate information is located, that is, location information, can be recognized in a case of being unable to recognize the characteristic region to which the location information belongs.

For example, the location information may be "Hongyuan building, No. 2 building, No. 6 yard, Jiuxianqiao Ave, Chaoyang District, BEIJING".

In implementation, in a case that there is a second geographical server for providing a location information recognition service, an interface of the second geographical server may be called. The geographical coordinate information is assembled into a call request according to parameter specifications of the interface, and the call request is transmitted to the interface, to call the location information recognition service of the second geographical server, and acquire location information returned by the second geographical server.

For example, the second geographical server may return location information as follows: a province name (the province name is null in a case of municipality), a city name, a city code, a district (county) name, a district code, a street and house number, detailed address and description information.

In the embodiment of the present disclosure, the existing location information recognition service is reused by calling the second geographical server, to recognize the location information, thereby reducing the cost.

In practice, a component for providing the location information recognition service may be deployed in local in the embodiment of the present disclosure, to speed up in recognizing the location information, which is not limited in the embodiments of the present disclosure.

In step 203, matching is performed between the position information and a communication group created in advance.

In the implementation, a suitable communication group is searched for in a case that the position information of the user is recognized, to provide a communication service.

In an optional embodiment of the present disclosure, the communication group may have a group name, and step 203 may include the following substeps in the embodiment of the present disclosure:

In substep S61, whether the position information includes a group name of a communication group created in advance is determined, and the method is turned to substep S62 in a case that the position information includes the group name of the communication group created in advance.

In substep S62, it is determined that the position information matches with the communication group created in advance successfully.

In the embodiment of the present disclosure, each communication group has a unique group name to identify the communication group, and the group name is named based on the position information.

In a normal case (in a case that the position information includes the location information), the position information may include the group name. In a special case (in a case that the position information includes the characteristic region information), the position information is the same as the group name (that is, the position information includes the group name specially).

For example, in a case that a group name of a communication group created in advance is "Hongyuan building", position information of "Hongyuan building, No. 2 building, No. 6 yard, Jiuxianqiao Ave, Chaoyang District, BEIJING" matches with the communication group since the position information includes the "Hongyuan building".

In step 204, an association relation between the first user identifier and the communication group is established in a case that the position information matches with the communication group created in advance successfully. The communication group has one or more associated second user identifiers.

In the embodiment of the present disclosure, users in the communication group have a same authority. The users are members in the communication group, and have a default authority of the user of the communication group, and a privileged user such as a creator (commonly known as a group advocate) and a manager is not set in the communication group, the users in the communication group are equal in status, which facilitates equal communication between the users.

In the implementation, the communication group may has a unique group ID, and an association relation between the user identifier and the communication group can be established by establishing an association relation between the user identifier and the group ID, to enable the user to join into the communication group.

After the association relation is established, the server may return information on the communication group to the terminal. The information includes the users in the communication group, user interface (for example a session window) display, system interface configuration and the like.

The terminal performs corresponding processing after receiving the information, to enable the current user to communication with other users in the communication group.

For example, a session window of the communication group is created, and information on the other users in the communication group is loaded in the session window.

In the embodiment of the present disclosure, position information corresponding to geographical coordinate information of a first terminal is recognized based on a configuration request for the communication group transmitted by the first terminal, matching is performed between the position information and the communication group created in advance, and an association relation between the user identifier and the communication group is established, therefor, the user can join into the communication group automatically without searching for the communication group based on a key word; all users in the communication group have a same authority, and can join into the communication group without invitation or application, thereby reducing a communication frequency among a terminal of a user invited or applying, a terminal of a manager and a server in an application or invitation process, greatly improving operation convenience, reducing time consumption and reducing consumption for system resources and a network bandwidth of the terminal and the server.

In step 205, a second user identifier and a communication manner matching with the first user identifier are searched for.

In step 206, the communication manner is pushed to the first terminal and the second terminal, the second terminal corresponds to the second user identifier matching with the first user identifier.

Figure 3:
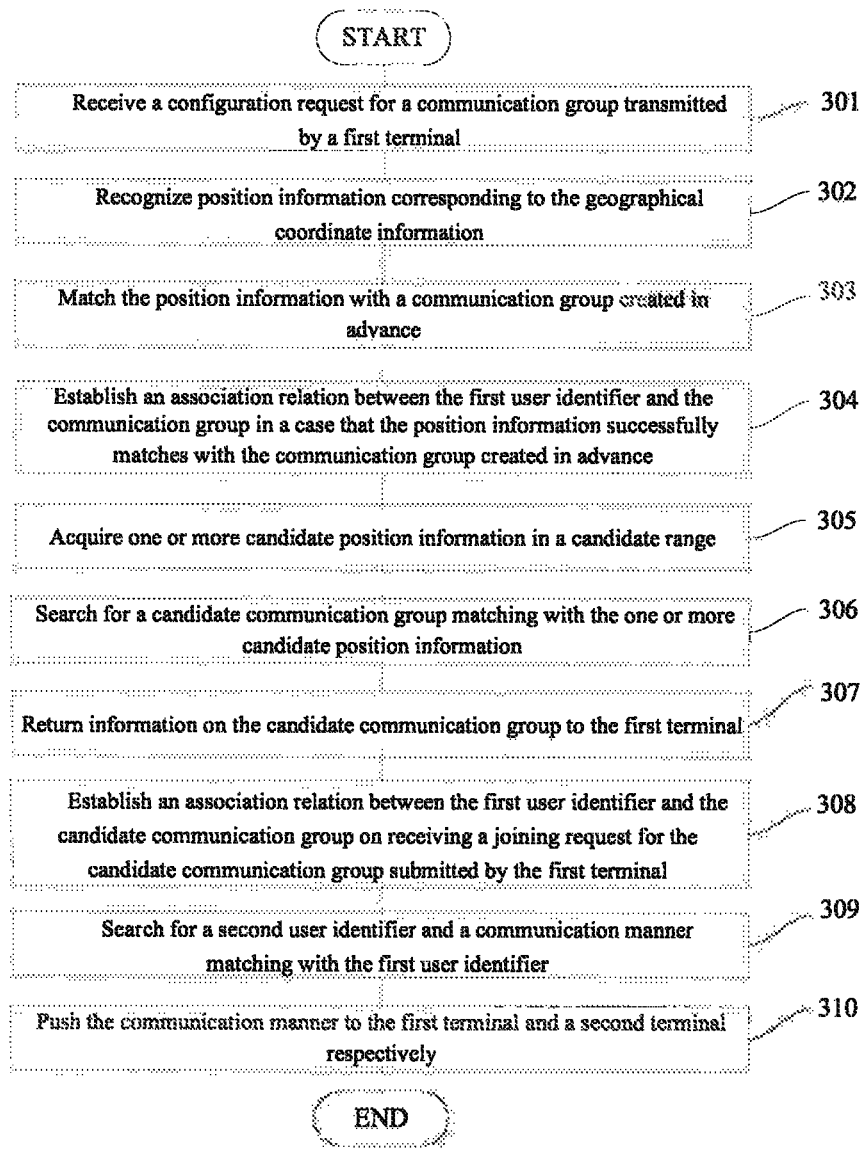
FIG. 3 is a schematic flow diagram of steps of a method for pushing information based on a communication group according to a third embodiment of the present disclosure.

With reference to FIG. 3, which is a schematic flow diagram of steps in a method for pushing information based on a communication group according to an embodiment of the present disclosure, the method includes the following steps:

In step 301, a configuration request for a communication group transmitted by a first terminal is received. The configuration request includes geographical coordinate information and a first user identifier.

In step 302, position information corresponding to the geographical coordinate information is recognized.

In step 303, matching is performed between the position information and a communication group created in advance.

In step 304, an association relation between the first user identifier and the communication group is established in a case that the position information matches with the communication group successfully.

In step 305, one or more candidate position information in a candidate range is acquired.

In the implementation, recognition accuracy for the position information is affected by multi-aspect conditions, such as software and hardware of the terminal and a network situation.

In some usage scenarios, the user may meet a problem that the GPS satellite is not connected properly, and network positioning is required to solve the problem. The network positioning is disturbed by multiple environment factors such as communication base station switch, signal block, Wi-Fi off, unstable system resources, which results in an error in positioning the position information.

Positioning is performed on a border between different positions, the position information is positioned incorrectly even in a case of a positioning error of several meters.

For example, if a user is located in a building A, and is close to a border between the building A and a building B, the user may be positioned to the building B.

Therefore, a candidate range may be acquired in the embodiment of the present disclosure, the candidate range is searched for one or more candidate position information, to extend a candidate range of the communication group.

Candidate position information nearby the position information of the current user is recognized in the candidate range, the candidate position information may further be one or more position information closest to the position information of the current user.

In the embodiment of the present disclosure, the candidate range may be determined based on the geographical coordinate information.

For example, a circular candidate range is determined with taking the geographical coordinate information as a center and a specified distance (such as 2 kilometers and 3 kilometers) as a radius.

Of course, the above candidate range is only exemplary, other candidate ranges may be set based on actual needs in the embodiment of the present disclosure, for example, a candidate range in a rectangular shape, triangular shape, prismatic shape or the like may be determined with taking the geographical coordinate information as a center, alternatively, a candidate range is determined at front, back, left side or right side or the like of the geographical coordinate system, which is not limited in the embodiment of the present disclosure.

In the implementation, in a case that there is a second geographical server for providing a location information recognition service, an interface of the second geographical server may be called. The geographical coordinate information is assembled into a call request according to parameter specifications of the interface, and the call request is transmitted to the interface, to call the geographical coordinate information recognition service of the second geographical server, and acquire location information and candidate position information returned by the second geographical server.

In the embodiment of the present disclosure, the existing location information recognition service is reused by calling the second geographical server, to recognize the candidate position information, thereby reducing the cost.

In practice, a component for providing the location information recognition service may be deployed in local in the embodiment of the present disclosure, to speed up in recognizing the candidate position information, which is not limited in the embodiments of the present disclosure.

In step 306, a candidate communication group matching with the one or more candidate position information is queried.

In the implementation, candidate communication groups matching with the position information may be searched for in a case that the position information of the user is recognized, to be selected by the user.

In an optional embodiment of the present disclosure, the communication group may have a group name, and step 306 may include the following substeps in the embodiment of the present disclosure:

In substep S71, whether the candidate position information includes a group name of a communication group created in advance is determined, the method is turned to substep S72 in a case that the candidate position information includes the group name of the communication group created in advance, and to substep S73 in a case that the candidate position information does not include the group name of the communication group created in advance.

In substep S72, it is determined that the candidate position information matches with the communication group created in advance successfully.

In substep S73, it is determined that the candidate position information does not match with the communication group created in advance.

In the embodiment of the present disclosure, each communication group has a unique group name, to identify the communication group, and the group name is named based on the position information.

In a normal case (in a case that the candidate position information is location information), the candidate position information may include the group name. In a special case (in a case that the candidate position information is characteristic region information), the candidate position information is the same as the group name (that is, the candidate position information includes the group name specially).

In a case that the candidate position information includes the group name, the candidate position information matches with the communication group created in advance successfully, and the communication group created in advance may be served as a candidate communication group. In a case that the candidate position information does not include the group name, the candidate position information does not match with the communication group created in advance.

In step 307, information on the candidate communication group is returned to the first terminal.

In step 308, an association relation between the first user identifier and the candidate communication group is established on receiving a joining request for the candidate communication group submitted by the first terminal.

In the implementation, a communication group matching with the position information of the current user may be a default communication group, and a communication group matching with candidate position information nearby the position information of the current user may be a candidate communication group.

An association relation between the user identifier and the candidate communication group may be established when the user transmits the joining request by an operation such as click and requests joining into the candidate communication group, to enable the user to join into the candidate communication group.

Specifically, the communication may have a unique group ID, and an association relation between the user identifier and the communication group is established by establishing an association relation between the user identifier and the group ID.

In the embodiment of the present disclosure, communication groups matching with one or more candidate position information are queried in a candidate range, and are returned to a terminal to display, and a correct communication group can be returned to the first terminal by suitably extending the candidate range of the communication group in a case that an error occurs in positioning, to be selected by the user, thereby fixing a problem that positioning accuracy is lower in some cases, and reducing an influence that an error occurs in joining into the communication group since an error occurs in positioning of the position information, and improving fault tolerance.

It should be illustrated that the user can join into the default communication group and the candidate communication group, there are one or more associated second user identifiers in the default communication group and the candidate communication group, a communication manner may be pushed to users in the default communication group and the candidate communication group in the embodiment of the present disclosure.

In step 309, a second user identifier and a communication manner matching with the first user identifier are searched for.

In step 310, the communication manner is pushed to the first terminal and the second terminal, the second terminal corresponds to the second user identifier matching with the first user identifier.

Figure 4:
FIG. 4 is a schematic flow diagram of steps of a method for pushing information based on a communication group according to a fourth embodiment of the present disclosure.

With reference to FIG. 4 which is a schematic flow diagram of steps in a method for pushing information based on a communication group according to an embodiment of the present disclosure, the method includes the following steps:

In step 401, a configuration request for a communication request transmitted by a first terminal is received. The configuration request includes geographical coordinate information and a first user identifier.

In step 402, position information corresponding to the geographical coordinate information is recognized.

In step 403, matching is performed between the position information and a communication group created in advance.

In step 404, an association relation between the first user identifier and the communication group is established in a case that the position information matches with the communication group created in advance successfully. The communication group has one or more associated second user identifiers.

In step 405, a communication frequency of the communication group associated with the first user identifier is increased in a case that the position information matches with the communication group created in advance successfully.

In step 406, communication frequencies of the communication groups associated with the first user identifier is queried.

In the embodiment of the present disclosure, multiple communication groups are stored in the terminal in a case that the user has been in several places.

In the embodiment of the present disclosure, each communication group associated with the first user identifier may be configured with a communication frequency. Every time the communication group matches with the position information, the communication frequency of the communication group is increased by 1.

In step 407, the communication groups associated with the first user identifier are ranked based on the communication frequencies thereof.

In step 408, information on the ranked communication groups associated with the first user identifier are returned to the first terminal.

In the implementation, a larger communication frequency of the communication group means that the user has been in a place corresponding to the communication group more frequently, and the user performs activities in the position more frequently and has a higher requirement for the communication group.

A smaller communication frequency of the communication group means that the user has been in a place corresponding to the communication group more infrequently, and the user performs activities in the position more infrequently and has a lower requirement for the communication group.

In the embodiment of the present disclosure, information on the communication groups ranked based on the communication frequencies is returned to the first terminal to display, a communication group having a larger communication frequency is displayed first preferentially to display, thereby avoiding the user from performing an operation such as page turning, further improving operation convenience and reducing a resource for responding to the operation by the terminal.

In step 409, a second user identifier and a communication manner matching with the first user identifier are searched for.

In step 410, the communication manner is pushed to the first terminal and the second terminal. The second terminal corresponds to the second user identifier matching with the first user identifier.

Figure 5:
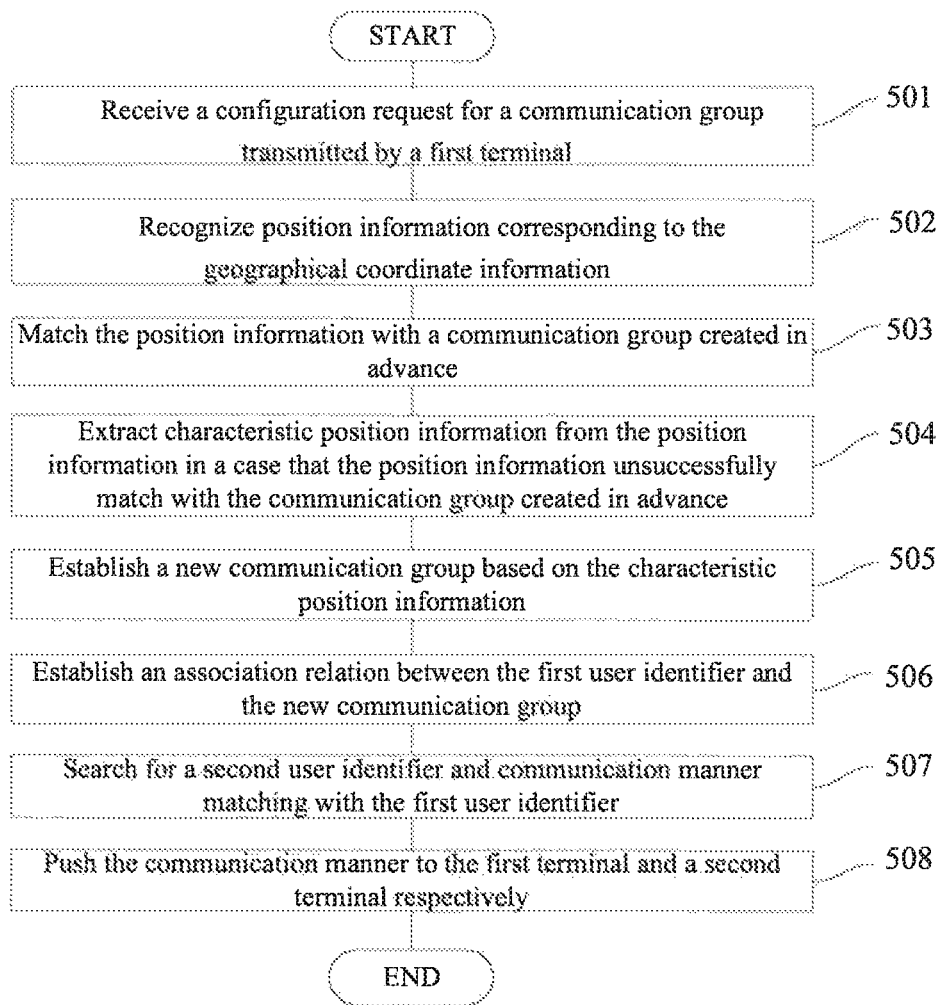
FIG. 5 is a schematic flow diagram of steps of a method for pushing information based on a communication group according to a fifth embodiment of the present disclosure.

With reference to FIG. 5, which is a schematic flow diagram of steps of a method for pushing information based on a communication group according to an embodiment of the present disclosure, the method includes the following steps:

In step 501, a configuration request for a communication request transmitted by a first terminal is received. The configuration request includes geographical coordinate information and a first user identifier.

In step 502, position information corresponding to the geographical coordinate information is recognized.

In step 503, matching is performed between the position information and a communication group created in advance.

In an optional embodiment of the present disclosure, the communication group may include a group name, and step 503 may include the following substeps in the embodiment of the present disclosure:

In substep S81, whether the position information includes a group name of a communication group created in advance is determined, and the method is turned to substep S82 in a case that the position information includes the group name of the communication group created in advance.

In substep S82, it is determined that the position information does not match with a communication group created in advance.

In the embodiment of the present disclosure, each communication group has a unique group name, to identify the communication group, and the group name is named based on the position information.

In a normal case (in a case that the position information is location information), the position information may include the group name. In a special case (in a case that the position information is characteristic region information), the position information is the same as the group name (that is, the position information includes the group name specially).

For example, a group name of the communication group created in advance is "the Beijing University" and "the China University of Geosciences", the position information "Hongyuan building, No. 2 building, No. 6 yard, Jiuxianqiao Ave, Chaoyang District, BEIJING" does not match with the communication group created in advance since "the Beijing University" and "the China University of Geosciences" are not contained in the position information.

In step 504, characteristic position information is extracted from the position information in a case that the position information does not match with the communication group created in advance.

Not matching indicates that a communication group of a position where the user is located is not created at present, and it needs to create a communication group of the position where the user is located.

The characteristic position information may be information representing a characteristic of a location.

For example, characteristic position information of the position information "Hongyuan building, No. 2 building, No. 6 yard, Jiuxianqiao Ave, Chaoyang District, BEIJING" may be "Hongyuan building" or "No. 2 building, NO. 6 yard, Jiuxianqiao Ave", which can be set by those skilled in the art according to actual situation, and is not limited in the embodiment of the present disclosure.

In an optional embodiment of the present disclosure, step 504 may include a following substep:

In substep S91, characteristic region information is set as characteristic position information in a case that the position information includes the characteristic region information.

In the embodiment of the present disclosure, in a case the user is located in a preset characteristic region, the characteristic region information of the characteristic region may be served as characteristic position information.

In an optional embodiment of the present disclosure, step 504 may include a following substep:

In substep S92, in a case that the position information is location information, a specified parameter is extracted from the location information as the characteristic position information.

In the embodiment of the present disclosure, in a case that the position information includes the location information, a specified parameter in the location information may be extracted as the characteristic position information.

For example, the acquired location information is in a format as follows: a province name (a province name is null in a case of municipality), a city name, a city code, a district (county) name, a district code, a street and house number, detailed address and description information.

In the example, the description information may be served as the characteristic position information.

In step 505, a new communication group is established based on the characteristic position information.

In the implementation, a new communication group is established based on the characteristic position information, and the communication group has a geographical property.

In an optional embodiment of the present disclosure, step 505 may include a following substep:

In substep S101, a new communication group is established with taking the characteristic position information as a group name.

In the embodiment of the present disclosure, a user is reminded of the geographical property of the communication group in a simple way with taking the characteristic position information as the group name, without viewing information such as introduction for the communication group, thereby further improving operation convenience.

In addition, the characteristic position information has uniqueness, the communication group also has uniqueness, thereby avoiding from creating a same group and wasting resources, and making communication between users be centralized, easy and convenient, and further improving operation convenience.

In step 506, an association relation between the first user identifier and the new communication group is established.

In the implementation, the communication group may has a unique group ID, and after the communication group is created, an association relation between the user identifier and the communication group is established by establishing an association relation between the user identifier and the group ID, to let the user to join into the communication group.

After the association relation is established, the server may return information related with the communication group to the terminal. The information may include a user of the communication group, user interface (for example, session window) display, system interface configuration and the like.

It should be illustrated that, although the current user is a user for triggering creating the communication group, in the embodiment of the present disclosure, the user is not configured with a authority of a privileged user such as a creator and a manager. The user has a same authority as a user joined subsequently, and the authority is a default authority of a member in the communication group, such as transmitting information (including a text, a picture, a language and the like), uploading a file, viewing profile of a group member, transmitting a request to add a friend to the group member, quitting the group and is not a management authority.

After the communication group is established, other users can join into the communication group, the communication group has one or more associated second user identifiers, and a communication manner may be pushed to the user in the created communication group in the embodiment of the present disclosure.

In step 507, a second user identifier and a communication manner matching with the first user identifier are searched for.

In step 508, the communication manner is pushed to the first terminal and the second terminal, the second terminal corresponds to the second user identifier matching with the first terminal.

Since geographical positions are divided in detail in real life, people perform activities in a geographical position unit, and people in the unit have a communication requirement.

For example, students have classes in the school, and have a requirement of discussing study; merchants perform commodity exchanges in a business center, and have a requirement of discussing prices; white-collar workers work in an office building, and have a requirement of discussing work.

In a traditional communication group, a whole communication group is managed by a privileged user such as a creator or a manager, in this case, statuses of the members in the communication group are not equal, which results in a communication gap between the people.

For example, the privileged user such as the creator and the manager can refuse other user to join into the communication group randomly, and can delete (commonly known as kicking out from the group) a member in the communication group randomly, even dismiss the communication group, stops communication between members in the communication group and between the member and other users.

In the embodiments of the present disclosure, a communication group is created with taking the characteristic geographical information as the group name, the range of the communication group coincides with the geographical position in real life highly, for example, a communication group having a group name of "Beijing University" basically coincides with a region of the Beijing University in real life, thereby greatly meeting a communication requirement of the users in a same geographical position.

A subsequent user can join into the communication group by matching the position information, thereby reducing communication cost of the users in a same geographical position.

The communication gap between people is eliminated without the privileged user such as the creator and the manager, people around can directly communicate.

For easy description, the method embodiments are described as a series of action combinations, it can be known by those skilled in the art that the embodiments of the present disclosure are not limited by the described sequence of the actions, some steps can be performed in another sequence or simultaneously based on the embodiments of the present disclosure. It should be known by those skilled in the art that the embodiments in the specification are preferred embodiments, the actions related in the preferred embodiments are not necessary for the embodiments of the present disclosure.

Figure 6:
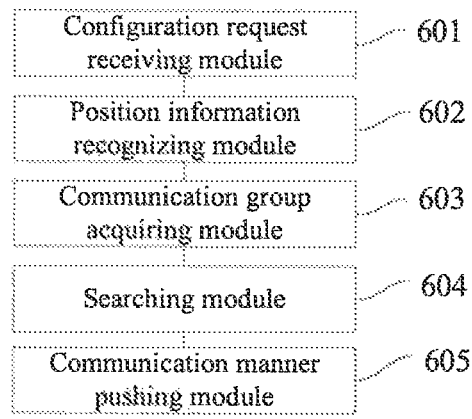
FIG. 6 is a schematic structural diagram of a device for pushing information based on a communication group according to an embodiment of the present disclosure.

With reference to FIG. 6, which is a schematic structural diagram of a device for pushing information based on a communication group according to an embodiment of the present disclosure, the device includes the following modules:

A configuration request receiving module 601 is configured to receive a configuration request for a communication group transmitted by a first terminal. The configuration request includes geographical coordinate information and a first user identifier.

A position information recognizing module 602 is configured to recognize position information corresponding to the geographical coordinate information.

A communication group acquiring module 603 is configured to acquire a communication group matching with the position information. The communication group has one or more associated second user identifiers.

A searching module 604 is configured to search for a second user identifier and a communication manner matching with the first user identifier.

A communication manner pushing module 605 is configured to push the communication manner to the first terminal and the second terminal. The second terminal corresponds to the second user identifier matching with the first user identifier.

In an optional embodiment of the present disclosure, the searching module 604 is further configured to: search the one or more second user identifiers for one or more candidate second user identifiers having path information at least partially overlapped with path information of the first user identifier; search the one or more candidate second user identifiers for one or more second user identifiers having behavior information or user information matching with behavior information or user information of the first user identifier; and search for a communication manner matching with the position information or user information.

In an optional embodiment of the present disclosure, the searching module 604 is further configured to: search for first path information corresponding to the first user identifier; search for one or more second path information corresponding to the one or more second user identifiers; calculating a coincidence degree between the first path information and each of the one or more second path information; extracting one or more second user identifiers having large coincidence degrees as one or more candidate second user identifiers.

In an optional embodiment of the present disclosure, the searching module 604 is further configured to: query property information of the position information; and search for a communication manner matching with the property information.

In an optional embodiment of the present disclosure, the communication manner pushing module 605 is further configured to push the communication manner to the first terminal; and push the communication manner to the second terminal.

In an optional embodiment of the present disclosure, the communication manner pushing module 605 is further configured to: push the communication manner to the first terminal; and on receiving an acknowledge operation returned by the first terminal for the communication manner, push the communication manner to a second terminal corresponding to the acknowledge operation.

In an optional embodiment of the present disclosure, the position information may include characteristic region information, the position information recognizing module 602 is further configured to acquire characteristic region information of a characteristic region to which the geographical coordinate information belongs.

In an optional embodiment of the present disclosure, the position information recognizing module 602 is further configured to acquire location information corresponding to the geographical coordinate information.

In an optional embodiment of the present disclosure, the communication group acquiring module 603 is further configured to: match the position information with a communication group created in advance; and establish an association relation between the first user identifier and the communication group in a case that the position information matches with the communication group created in advance successfully.

In an optional embodiment of the present disclosure, the communication group may has a group name, the communication group acquiring module 603 is further configured to: determine whether the position information includes a group name of a communication group created in advance; determine that the position information matches with the communication group created in advance successfully in a case that the position information includes the group name of the communication group created in advance; and determine that the position information does not match with the communication group created in advance in a case that the position information does not include the group name of the communication group created in advance.

In an optional embodiment of the present disclosure, the communication group acquiring module 603 is further configured to acquire one or more candidate position information in a candidate range, the candidate range is determined based on the geographical coordinate information; query a candidate communication group matching with the one or more candidate position information; and return information on the candidate communication group to the first terminal.

In an optional embodiment of the present disclosure, the communication group acquiring module 603 is further configured to establish an association relation between the first user identifier and the candidate communication group on receiving a joining request for the candidate communication group submitted by the first terminal.

In an optional embodiment of the present disclosure, the device further includes a communication frequency increasing module configured to increase a communication frequency of the communication group associated with the first user identifier in a case that the position information matches with the communication group created in advance successfully.

In an optional embodiment of the present disclosure, the device further includes a communication frequency querying module, a ranking module and a returning module.

The communication frequency querying module is configured to query communication frequencies of communication groups associated with the first user identifier.

The ranking module is configured to rank the communication groups associated with the first user identifier based on the communication frequencies.

The returning module is configured to return information on the ranked communication groups associated with the first user identifier to the first terminal.

In an optional embodiment of the present disclosure, the communication group acquiring module 603 is further configured to: extract characteristic position information from the position information in a case that the position information does not match with the communication group created in advance; and establishing a new communication group based on the characteristic position information.

In an optional embodiment of the present disclosure, the communication group acquiring module 603 is further configured to establish an association relation between the first user identifier and the new communication group.

In an optional embodiment of the present disclosure, the communication group acquiring module 603 is further configured to, in a case that the position information is characteristic region information, set the characteristic region information as characteristic position information.

In an optional embodiment of the present disclosure, the communication group acquiring module 603 is further configured to, in a case that the position information is location information, extract a specified parameter from location information as characteristic position information.

In an optional embodiment of the present disclosure, the communication group acquiring module 603 is further configured to establish a new communication group with taking the characteristic position information as a group name.

Since the device embodiment is similar to the method embodiment, the device embodiment is described simply, and related parts can refer to description for the method embodiment.

The various components embodiments of the disclosure can be realized by hardware, or realized by software modules running on one or more processors, or realized by combination thereof. A person skilled in the art should understand that microprocessor or digital signal processor (DSP) can be used for realizing some or all functions of some or all components of the device for pushing information based on the communication group according to the embodiments in the disclosure in practice. The disclosure can also realize one part of or all devices or system programs (for example, computer programs and computer program products) used for carrying out the method described here. Such programs for realizing the disclosure can be stored in computer readable medium, or can possess one or more forms of signal. Such signals can be downloaded from the Internet website or be provided at signal carriers, or be provided in any other forms.

Figure 7:
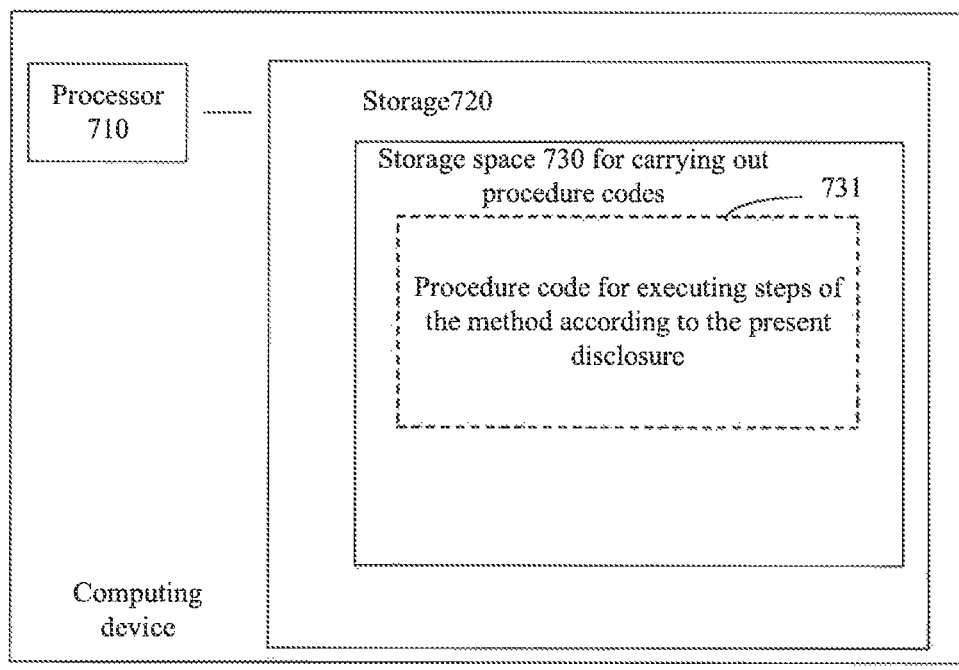
FIG. 7 is a schematic block diagram of a computing device for executing the method according to the present disclosure.
Figure 8:
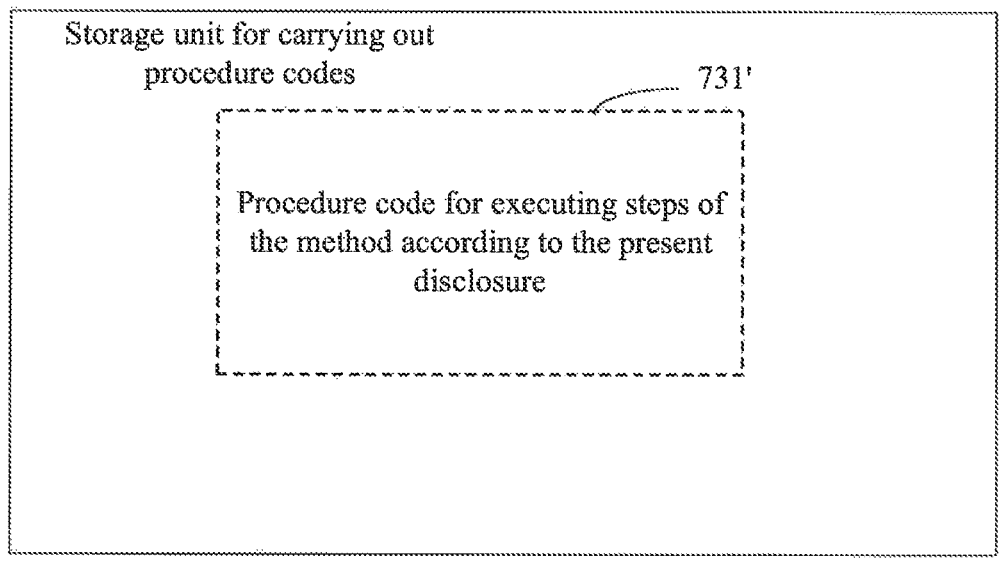
FIG. 8 is a schematic diagram of a storage unit for storing or carrying program codes for implementing the method according to the present disclosure.

For example, FIG. 7 shows a diagram for a computing device for pushing information based on a communication group according to the disclosure, for example, an application server. The computing device traditionally comprises a processor 710 and a computer program product in the form of storage 720 or a computer readable medium. The storage 720 can be electronic storage such as flash memory, EEPROM (Electrically Erasable Programmable Read-Only Memory), EPROM, hard disk or ROM, and the like. The storage 720 possesses storage space 730 for carrying out procedure code 731 of any steps of aforesaid method. For example, storage space 730 for procedure code can comprise various procedure codes 731 used for realizing any steps of aforesaid method. These procedure codes can be read out from one or more computer program products or written in one or more computer program products. The computer program products comprise procedure code carriers such as hard disk, Compact Disc (CD), memory card or floppy disk and the like. These computer program products usually are portable or fixed storage cell as said in FIG. 8. The storage cell can possess memory paragraph, storage space like the storage 720 in the computing device in FIG. 7. The procedure code can be compressed in, for example, a proper form. Generally, storage cell comprises computer readable code 731' for executing steps in the method according to the present disclosure, i.e. the code can be read by processors such as 710 and the like. When the codes run on a computer device, the computer device will carry out various steps of the method described above.

The "an embodiment", "embodiments" or "one or more embodiments" referred here mean being included in at least one embodiment in the disclosure combining specific features, structures or characteristics described in the embodiments. In addition, please note that the phrase "in an embodiment" not necessarily mean a same embodiment.

The description provided here explains plenty of details. However, it can be understood that the embodiments of the disclosure can be implemented without these specific details. The known methods, structure and technology are not shown in detail in some embodiments, so as not to obscure the understanding of the description.

It should be noticed that the embodiments are intended to illustrate the disclosure and not limit this disclosure, and a person skilled in the art can design substitute embodiments without departing from the scope of the appended claims. In the claims, any reference marks between brackets should not be constructed as limit for the claims. The word "comprise" does not exclude elements or steps that are not listed in the claims. The word "a" or "one" before the elements does not exclude that more such elements exist. The disclosure can be realized by means of hardware comprising several different elements and by means of properly programmed computer. In the unit claims several devices are listed, several of the systems can be embodied by a same hardware item. The use of words first, second and third does not mean any sequence. These words can be explained as name.

In addition, it should be noticed that the language used in the disclosure is chosen for the purpose of readability and teaching, instead of for explaining or limiting the topic of the disclosure. Therefore, it is obvious for a person skilled in the art to make a lot of modification and alteration without departing from the scope and spirit of the appended claims. For the scope of the disclosure, the disclosure is illustrative instead of restrictive. The scope of the disclosure is defined by the appended claims.

What is claimed is:

1. A method for pushing information based on a communication group, comprising:
 receiving a configuration request for a communication group transmitted by a first terminal, wherein the configuration request comprises geographical coordinate information and a first user identifier;
 recognizing position information corresponding to the geographical coordinate information;
 acquiring a communication group matching with the position information, wherein the communication group has one or more associated second user identifiers;
 searching for first path information corresponding to the first user identifier;
 searching one or more second path information corresponding to the one or more second user identifiers;
 calculating a coincidence degree between the first path information and each of the one or more second path information;

extracting one or more second user identifiers having the large coincidence degrees as the one or more candidate second user identifiers;

searching the one or more candidate second user identifiers for one or more second user identifiers having behavior information or user information matching with behavior information or user information of the first user identifier;

searching for a communication manner matching with the position information or the user information; and pushing the communication manner to the first terminal and a second terminal respectively, wherein the second terminal corresponds to the second user identifier matching with the first user identifier.

2. The method according to claim 1, wherein the searching for the communication manner matching with the position information or the user information comprises:

searching for property information of the position information; and searching for a communication manner matching with the property information.

3. The method according to claim 1, wherein the acquiring the communication group matching with the position information comprises:

matching the position information with a communication group created in advance;

establishing an association relation between the first user identifier and the communication group in a case that the position information successfully matches with the communication group created in advance.

4. The method according to claim 3, wherein the communication group has a group name, the matching the position information with the communication group created in advance comprises:

determining whether the position information contains a group name of a communication group created in advance;

determining that the position information successfully matches with the communication group created in advance in a case that the position information contains the group name of the communication group created in advance; and determining that the position information unsuccessfully match with the communication group created in advance in a case that the position information does not contain the group name of the communication group created in advance.

5. The method according to claim 3, wherein the acquiring the communication group matching with the position information further comprises:

acquiring one or more candidate position information in a candidate range, wherein the candidate range is determined based on the geographical coordinate information;

searching for a candidate communication group matching with the one or more candidate position information; and returning information on the candidate communication group to the first terminal, or wherein the acquiring the communication group matching with the position information further comprises:

extracting characteristic position information from the position information in a case that the position information unsuccessfully match with the communication group created in advance;

establishing a new communication group based on the characteristic position information.

6. The method according to claim 5, the acquiring the communication group matching with the position information further comprises:

establishing an association relation between the first user identifier and the candidate communication group on receiving a joining request for the candidate communication group submitted by the first terminal.

7. The method according to claim 1, further comprising:

increasing a communication frequency of the communication group associated with the first user identifier in a case that the position information successfully matches with the communication group created in advance.

8. The method according to claim 1, further comprising:

querying communication frequencies of communication groups associated with the first user identifier;

ranking the communication groups associated with the first user identifier based on the communication frequencies; and returning information on the ranked communication groups associated with the first user identifier to the first terminal.

9. A device for pushing information based on a communication group, comprising:

one or more processors; and a memory;

wherein one or more programs are stored in the memory, and when executed by the one or more processors, the one or more programs cause the one or more processors to:

receive a configuration request for a communication group transmitted by a first terminal, wherein the configuration request comprises geographical coordinate information and a first user identifier;

recognize position information corresponding to the geographical coordinate information;

acquire a communication group matching with the position information, wherein the communication group has one or more associated second user identifiers;

searching for first path information corresponding to the first user identifier;

searching for one or more second path information corresponding to the one or more second user identifiers;

calculating a coincidence degree between the first path information and each of the one or more second path information;

extracting one or more second user identifiers having the large coincidence degrees as the one or more candidate second user identifiers;

searching for the one or more candidate second user identifiers for one or more second user identifiers having behavior information or user information matching with behavior information or user information of the first user identifier;

searching for a communication manner matching with the position information or the user information; and push the communication manner to the first terminal and a second terminal respectively, wherein the second terminal corresponds to the second user identifier matching with the first user identifier.

10. The device according to claim 9 wherein the one or more processors are further caused to:

search for property information of the position information; and search for a communication manner matching with the property information.

11. The device according to claim 9, wherein the one or more processors are further caused to:
- match the position information with a communication group created in advance;
- establish an association relation between the first user identifier and the communication group in a case that the position information successfully matches with the communication group created in advance.

12. The device according to claim 11, wherein the communication group has a group name, and the one or more processors are further caused to:
- determine whether the position information contains a group name of a communication group created in advance;
- determine that the position information successfully matches with the communication group created in advance in a case that the position information contains the group name of the communication group created in advance; and
- determine that the position information unsuccessfully match with the communication group created in advance in a case that the position information does not contain the group name of the communication group created in advance.

13. The device according to claim 11, wherein the one or more processors are further caused to:
- acquire one or more candidate position information in a candidate range, wherein the candidate range is determined based on the geographical coordinate information;
- search for a candidate communication group matching with the one or more candidate position information; and
- return information on the candidate communication group to the first terminal, or wherein the one or more processors are further caused to:
- extract characteristic position information from the position information in a case that the position information unsuccessfully match with the communication group created in advance;
- establish a new communication group based on the characteristic position information.

14. The device according to claim 13, wherein the one or more processors are further caused to:
- establish an association relation between the first user identifier and the candidate communication group on receiving a joining request for the candidate communication group submitted by the first terminal.

15. The device according to claim 9, wherein the one or more processors are further caused to:
- query communication frequencies of communication groups associated with the first user identifier;
- rank the communication groups associated with the first user identifier based on the communication frequencies; and
- return information on the ranked communication groups associated with the first user identifier to the first terminal.

16. A non-transitory computer readable medium having computer programs stored thereon that, when executed by one or more processors of a computing device, cause the computing device to perform operations for pushing information based on a communication group, the operations comprising:
- receiving a configuration request for a communication group transmitted by a first terminal, wherein the configuration request comprises geographical coordinate information and a first user identifier;
- recognizing position information corresponding to the geographical coordinate information;
- acquiring a communication group matching with the position information, wherein the communication group has one or more associated second user identifiers;
- searching for first path information corresponding to the first user identifier;
- searching one or more second path information corresponding to the one or more second user identifiers;
- calculating a coincidence degree between the first path information and each of the one or more second path information;
- extracting one or more second user identifiers having the large coincidence degrees as the one or more candidate second user identifiers;
- searching the one or more candidate second user identifiers for one or more second user identifiers having behavior information or user information matching with behavior information or user information of the first user identifier;
- searching for a communication manner matching with the position information or the user information; and
- pushing the communication manner to the first terminal and a second terminal respectively, wherein the second terminal corresponds to the second user identifier matching with the first user identifier.

* * * * *